United States Patent
Lai et al.

(10) Patent No.: US 7,582,146 B2
(45) Date of Patent: Sep. 1, 2009

(54) UNIFORM AEROSOL DEPOSIT SAMPLING DEVICE

(75) Inventors: Chane-Yu Lai, Shetou Township, Changhua County (TW); Perng-Jy Tsai, Tainan (TW); Da Toung Tang, Taipei (TW); Tung-Sheng Shih, Taipei (TW); Hsin-Ying Lee, Taichung (TW); Wam Yu Lee, Sanchong (TW)

(73) Assignee: Institute of Occupational Safety and Health, Council of Labor Affairs, Executive Yuan, Taipei County (TW)

( * ) Notice: Subject to any disclaimer, the term of this patent is extended or adjusted under 35 U.S.C. 154(b) by 291 days.

(21) Appl. No.: 11/524,939

(22) Filed: Sep. 22, 2006

(65) Prior Publication Data

US 2008/0072764 A1    Mar. 27, 2008

(51) Int. Cl.
*B01D 46/10* (2006.01)
*G01N 1/22* (2006.01)

(52) U.S. Cl. .............. 96/413; 55/503; 55/510; 73/863.23

(58) Field of Classification Search .......... 96/413; 55/462, 465, 503, 510; 73/863.21, 863.22, 73/863.23, 864.51, 864.71, 864.84, 864.85, 73/863.25
See application file for complete search history.

(56) References Cited

U.S. PATENT DOCUMENTS

| | | | | |
|---|---|---|---|---|
| 3,012,413 A | * | 12/1961 | Anderson | 62/272 |
| 3,561,253 A | * | 2/1971 | Dorman | 73/24.03 |
| 3,972,225 A | * | 8/1976 | Fort et al. | 73/28.04 |
| 4,014,216 A | * | 3/1977 | Thornton et al. | 73/863.23 |
| 4,148,732 A | * | 4/1979 | Burrow et al. | 210/232 |
| 4,155,247 A | * | 5/1979 | Kaczmarek et al. | 73/863.23 |
| 4,362,047 A | * | 12/1982 | vonReis et al. | 73/23.33 |
| 4,544,386 A | * | 10/1985 | Trayford et al. | 73/863.23 |
| 4,606,232 A | * | 8/1986 | Prodl | 73/863.23 |
| 4,883,507 A | * | 11/1989 | Rey et al. | 95/273 |
| 4,961,916 A | * | 10/1990 | Lesage et al. | 422/88 |
| 5,369,981 A | * | 12/1994 | Merz et al. | 73/28.01 |
| 5,723,047 A | * | 3/1998 | Turnbull | 210/445 |
| 6,033,455 A | * | 3/2000 | Kurashima | 55/497 |
| 6,672,135 B2 | * | 1/2004 | Adiletta | 73/28.04 |
| 7,341,669 B2 | * | 3/2008 | Ferguson | 210/741 |
| 2004/0221665 A1 | * | 11/2004 | Stroka | 73/863.23 |

\* cited by examiner

*Primary Examiner*—Duane Smith
*Assistant Examiner*—Robert A Clemente
(74) *Attorney, Agent, or Firm*—Rosenberg, Klein & Lee

(57) ABSTRACT

A uniform aerosol deposit sampling device includes a first housing and a second housing. The first housing has an air inlet and a first chamber. The second housing has an air outlet, an second chamber, a filter holder and a flow guiding portion. The filter holder is provided for securing an air-penetratable supporting pad and a filter media. The flow guiding portion is a substantially conical and gradually narrowing. The flow guiding portion has a semi-conical angle ranged from 15 to 85 degrees. So, the flow guiding portion makes the entire air flow smooth and evenly distributed. The aerosols will be evenly distributed and uniformly deposited on the filter media. And, it is easy to evaluate the amount and composition of the aerosols.

5 Claims, 5 Drawing Sheets

UNIFORM AEROSOL DEPOSIT SAMPLING DEVICE

BACKGROUND OF INVENTION

1. Field of the Invention

The present invention relates to a uniform aerosol deposit sampling device. In which, the flow guiding portion makes the entire air flow smooth and evenly distributed. The aerosols will be evenly distributed and uniformly deposited on the filter surface. And, it is easy to evaluate the amount and composition of the aerosols.

2. Description of the Prior Art

Referring to FIGS. 7 and 8, a typical conventional atmospheric aerosol sampling device comprising:

a first body 81 including a first connecting portion 811 and a fist through-hole 812;

a second body 82 including:

a second connecting portion 821 for allowing the second body 82 and the first connecting portion 811 be connected together;

a first-staged flow guiding portion 822 disposed in the second body 82, the first-staged flow guiding portion 822 having an air-penetratable supporting pad 91 and a filtering media 92;

a second-staged flow guiding portion 823 disposed in the second body 82, the second-staged flow guiding portion 823 being lower than the first-staged flow guiding portion 822, and the first-staged and second staged flow guiding portions 822, 823 being shaped as a step-like structure in the second body 82;

a second through-hole 824 being connected with the first through-hole 812, the first-staged flow guiding portion 822 and the second-staged flow guiding portion 823.

An aerosol size-selective sampler 93 is mounted on the first body 81. This aerosol size-selective sampler 93 communicates with the first through-hole 812. There is an air pump 94 disposed on the second body 82. Once the user turns on the air pump 94, this pump will draw the air in (it also sucks in many aerosols 95, as illustrated in FIG. 9). After which, the air continues to pass through the filtering media 92 and then to pass through the first-staged and second staged flow guiding portions 822, 823. Finally, it will be sucked out by the air pump 94 through the second through-hole 824. Therefore, these aerosols 95 will deposit and stay on the filter media 92. After certain time, the filter media 92 can be taken out. By counting or calculating the total number of the aerosols 95 stayed on the filter media 92, it can predict the exact concentration of the aerosols 95 in this working environment. Of course, it also can be measured by a conventional X-ray detecting method or any other available existing method to calculate the concentration or amount of the aerosols 95.

However, about the above-mentioned conventional device, it has many disadvantages or problems as listed below.

[1] the flowing air is not evenly distributed. The step-like structure is constituted by the first-staged and the second staged flow guiding portions. So, when the air flows through them and through the filter media, they will cause some pressure differences in the air stream. Thus, it will influence its flowing direction, and flowing pattern. Therefore, the flowing air is not evenly distributed and always lead the air streamlines to become turbulent or to have vortices.

[2] These aerosols cannot be evenly distributed on the filter media. It is primarily caused by its non-uniform air flowing through the filter media. The air passes through the first-staged and second-staged flow guiding portions 822, 823. However, the flow rate of the air will not be evenly distributed due to the step-like structure. For example, the aerosol distribution in the third position P3 and aerosol distribution in the fourth position P4 are not evenly distributed (referring to FIG. 9 and to the enlarged illustration in FIG. 10). Consequently, aerosols could exhibit non-uniform deposition on the filter, and this occurrence also tends to influence even more the overall precision and accuracy of the analytical process.

[3] It is hard to count or calculate the aerosol amount. As show in FIG. 10, the amount of the aerosols 95 in a specific zone (or region) on the filter media 92 can be counted and evaluated by a microscope 96 and statistical methods, respectively. However, the aerosol concentrations in different zones of the filter media 92 are quite different, so it is very hard to evaluate the aerosol amount precisely. If someone selects one smaller zone to count the aerosol mount and then statistically predict the aerosol amount on the entire filter media 92. The result will be inaccurate. If someone randomly selects several smaller zones at different locations on the filter media 92, this person needs to multiply certain number to calculate the total aerosol amount on this filter media 92. It is troublesome to count or evaluate the aerosol amount.

SUMMARY OF THE INVENTION

The primary object of the present invention is to provide a uniform aerosol deposit sampling device. In which, the flow guiding portion makes the entire air flow smooth and evenly distributed.

The next object of the present invention is to provide a uniform aerosol deposit sampling device. The aerosols will be evenly distributed on the filter media.

The other object of the present invention is to provide a uniform aerosol deposit sampling device. In which, it is easy to evaluate the amount and composition of the aerosols.

DETAILED DESCRIPTION OF THE PREFERRED EMBODIMENT

Figure 1:
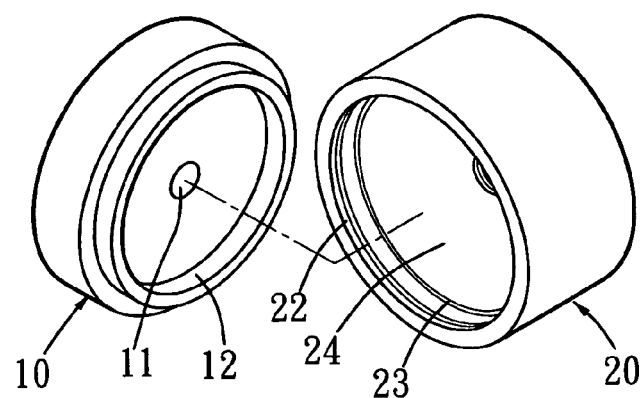
FIG. 1 is a perspective view showing the disassembled condition of the first preferred embodiment of the present invention.
Figure 2:
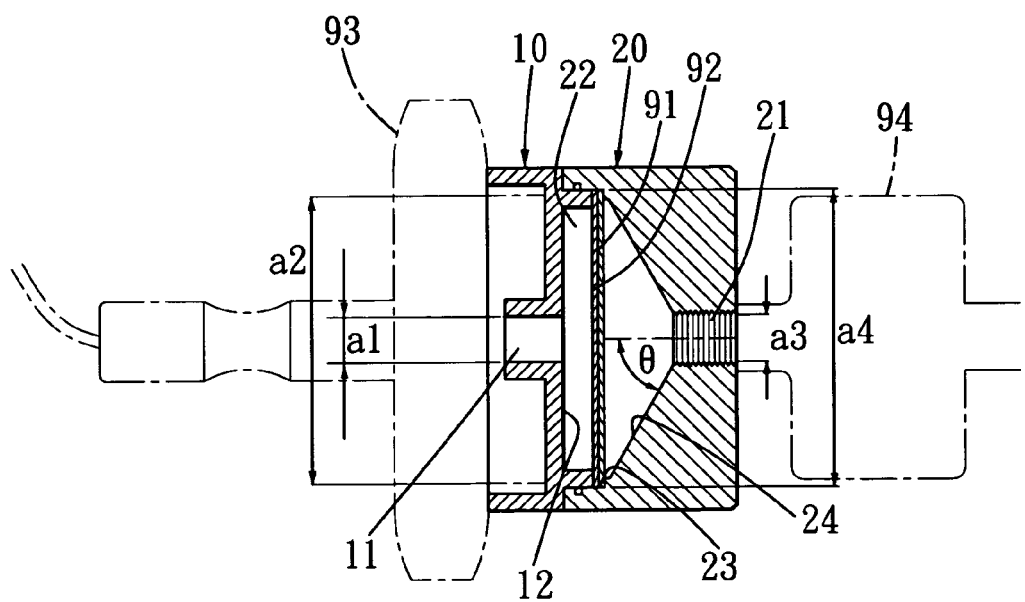
FIG. 2 shows an actual application of the first preferred embodiment of the present invention.

The present invention is a uniform aerosol deposit sampling device as shown in FIGS. 1 and 2. It comprises a first housing 10 and a second housing 20.

With regard to the first housing 10, it has an air inlet 11 and a first chamber 12. The air inlet 11 connects with this first chamber 12. The air inlet 11 has an air inlet cross-sectional area a1. The first chamber 12 has a first chamber cross-sectional area a2. The air inlet cross-sectional area a1 is smaller than the first chamber cross-sectional area a2.

About the second housing 20, it includes an air outlet 21, a second chamber 22, a filter holder 23 and a flow guiding portion 24. The air outlet 21 has an air outlet cross-sectional area a3. The air outlet 21 communicates with the flow guiding portion 24. This second chamber 21 connects with the first chamber 12. The second chamber 21 has a second chamber cross-sectional area a4. The second chamber cross-sectional area a4 is larger than the air outlet cross-sectional area a3.

Furthermore, this filter holder 23 is disposed between the second chamber 22 and the flow guiding portion 24 for securing an air-penetratable supporting pad 91 and a filter media 92. The air-penetratable supporting pad 91 is a paper-made plate with a plurality of tiny holes allowing air to penetrate through. The flow guiding portion 24 is a substantially conical and gradually narrowing along its flow path. This flow guiding portion 24 has a semi-conical angle ranged from 15 to 85 degrees (so as to obtain the best result).

As illustrated in FIG. 2, it shows the first preferred embodiment of the present invention. The air inlet 11 of the first housing 10 engages with a conventional aerosol size-selective sampler 93. The air outlet 21 of the second housing 20 connects with an air pump 94 for drawing air. Hence, it can be secured on a user's body or placed on a predetermined position in a working place (such as in a working environment that generating atmospheric aerosols and particles).

Once the air pump 94 is turned on, it draws air into the aerosol size-selective sampler 93. Finally, the air will leave the air pump 94. During this air-flowing process, the aerosol size-selective sampler 93 only allows certain-sized aerosols 95 (such as Silica or the like) into the present invention.

These aerosols 95 carried by the flowing air move into the aerosol size-selective sampler 93 and then arrives the first housing 10 through the air inlet 11. These aerosols 95 continue to move toward the second chamber 22 of the second housing 20 via the first chamber 12. However, when the air stream pass through filter media 92 and the air-penetratable supporting pad 91, these aerosols 95 stay and deposit on the filter media 92 (as shown in FIG. 3).

After a period of time, the detected amount of the aerosols 95 (the aerosols 95 can be Silica or other object) in the working environment can be measured by weighting the filter media 92. Hence, the mass concentration of silica in a specific working environment may be detected.

Furthermore, the flow guiding portion 24 is disposed between the second chamber 22 and the air outlet 21. The second chamber cross-sectional area a4 is larger than the air outlet cross-sectional area a3. So, the flow guiding portion 24 is shaped as substantially conical and gradually narrowing along its flow path. Therefore, the air stream can flow through the entire flow guiding portion 24 very smoothly, so that these aerosols 95 (or aerosols) will be evenly distributed or uniformly deposited on this filter media 92.

Figure 3:
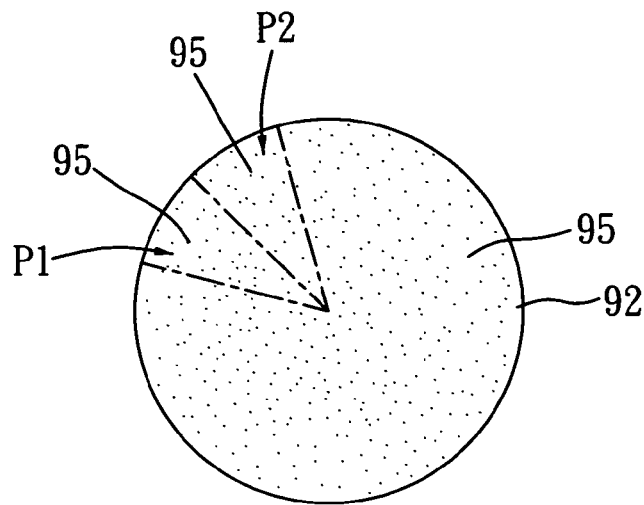
FIG. 3 is a view illustrating the aerosols on the filter media of the present invention.

Referring to FIG. 3 (which is an enlarged view), the air smoothly flows through the entire flow guiding portion 24 and then pass through the entire filter media 92 in an evenly distributed condition. Therefore, no matter in the first position P1 or the second position P2, the aerosols 95 collected will be substantially the same. Meanwhile, these aerosols 95 are evenly distributed.

Figure 4:
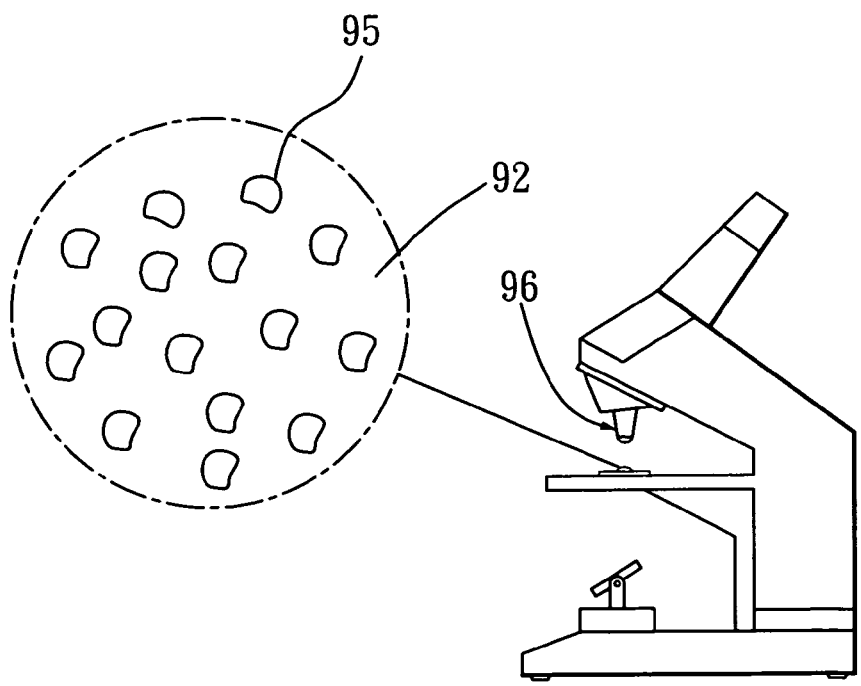
FIG. 4 is an enlarged view showing a portion of the aerosol distribution of the present invention observed by a microscope.

As shown in FIG. 4, due to the characteristics of uniform deposition, when someone needs to calculate the amount of these aerosols 95, this person only needs to calculate a small portion of the entire area and then multiply by certain number by using conventional statistical methods. For example, if the filter media 92 is equally divided into 1000 smaller portions. This person only needs to calculate the total amount of aerosols 95 (assuming there are 100 aerosols) in one smaller portion, and then multiply by 1000. Then, the total amount of these aerosols 95 on the filter media 92 can be calculated. This method is easier.

Practically, the aerosol size-selective sampler 93 can be a conventional aluminum-made aerosol size selective sampler.

The air pump 94 can be a conventional high volume personal sampler.

About the filter media 92, it can be 37 mm (diameter) with 5.0 μm PVC (polyvinyl chloride) filter media or other commonly-used existing one.

In addition, based on the actual requirement, the size of apertures or resistance of the filter media 92 can be altered, so the distribution condition of the collected aerosols 95 deposited on the filter media 92 will be changed accordingly.

Figure 5:
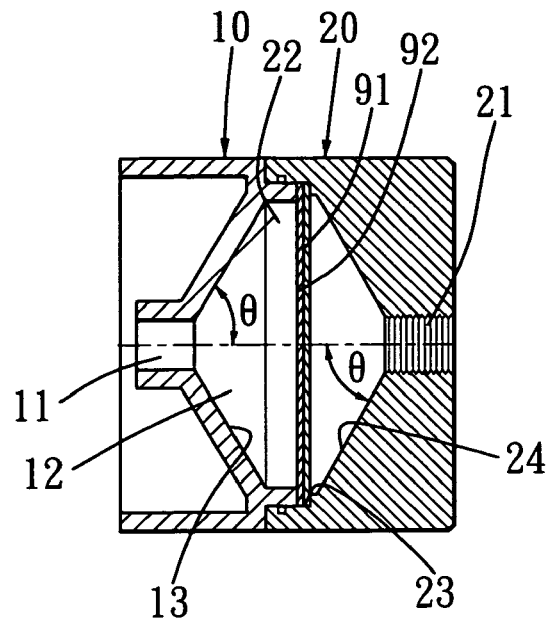
FIG. 5 is a cross-sectional view of the second preferred embodiment of the present invention.

As illustrated in FIG. 5, it shows the second preferred embodiment (which is modified from the first embodiment). The first chamber 12 of the first housing 10 furthers includes a conical portion 13. The conical portion 13 also has a semi-conical angle θ. This angle θ may be same or different to the semi-conical angle θ of the flow guiding portion 24. In fact, the exact angle can be adjusted by the design requirement. In this embodiment, the conical portion 13 makes the second chamber 12 of the first housing 10 gradually expanding so that the entering air flows very smoothly. Also, the aerosols 95 in the entering air are evenly distributed.

Figure 6:
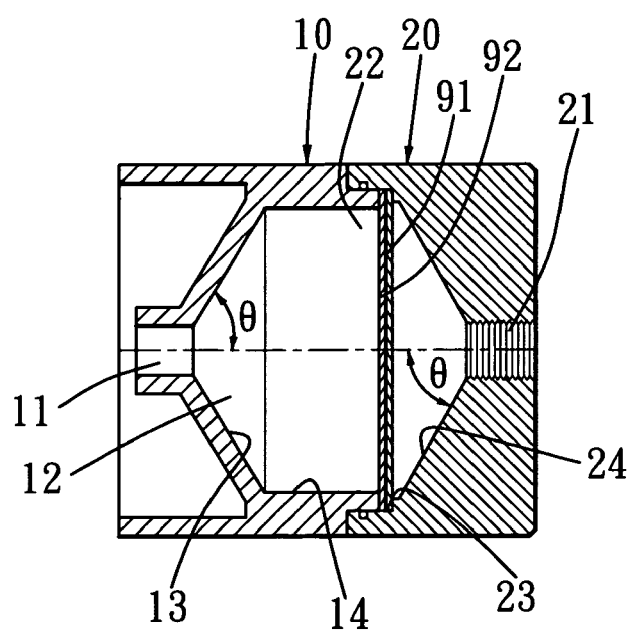
FIG. 6 is a cross-sectional view of the third preferred embodiment of the present invention.
Figure 7:
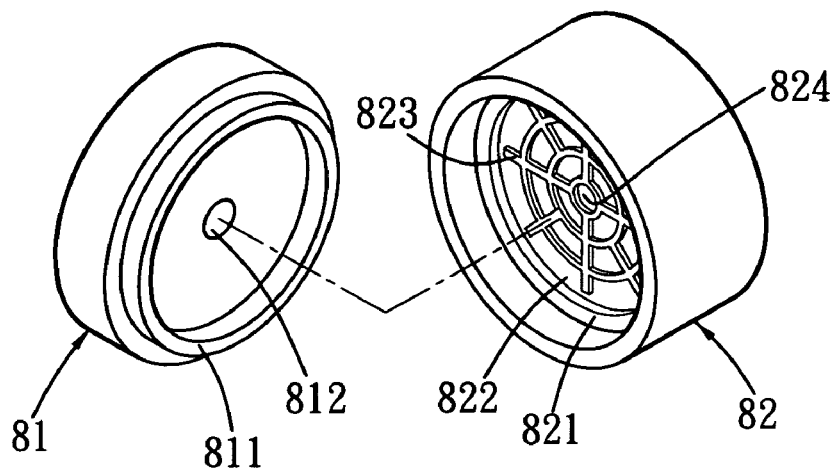
FIG. 7 is a perspective view showing the disassembled condition of the conventional device.
Figure 8:
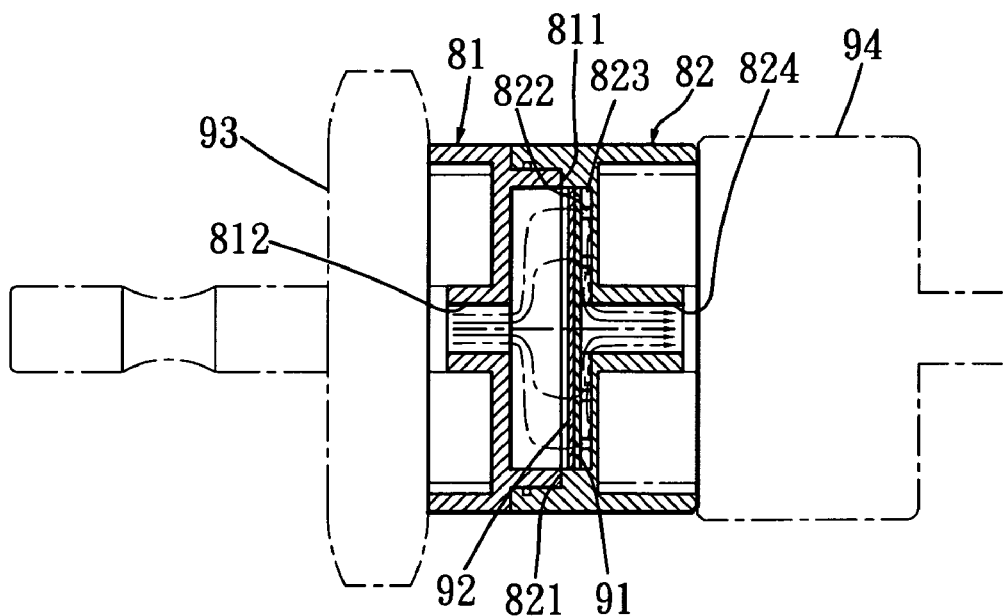
FIG. 8 shows the actual application of the conventional device.
Figure 9:
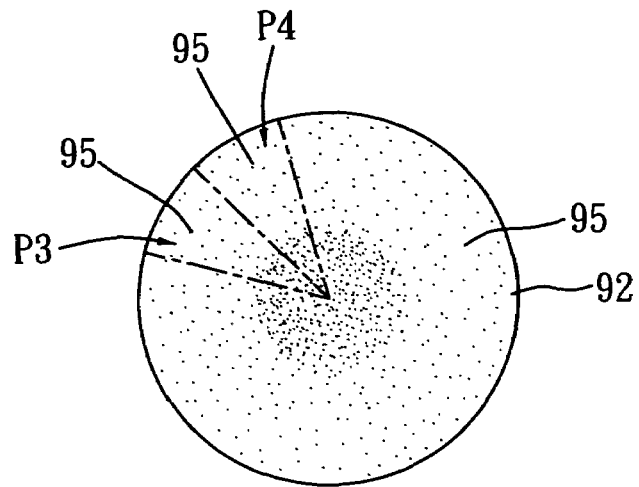
FIG. 9 is a view illustrating the aerosols on the filter media of the conventional device.
Figure 10:
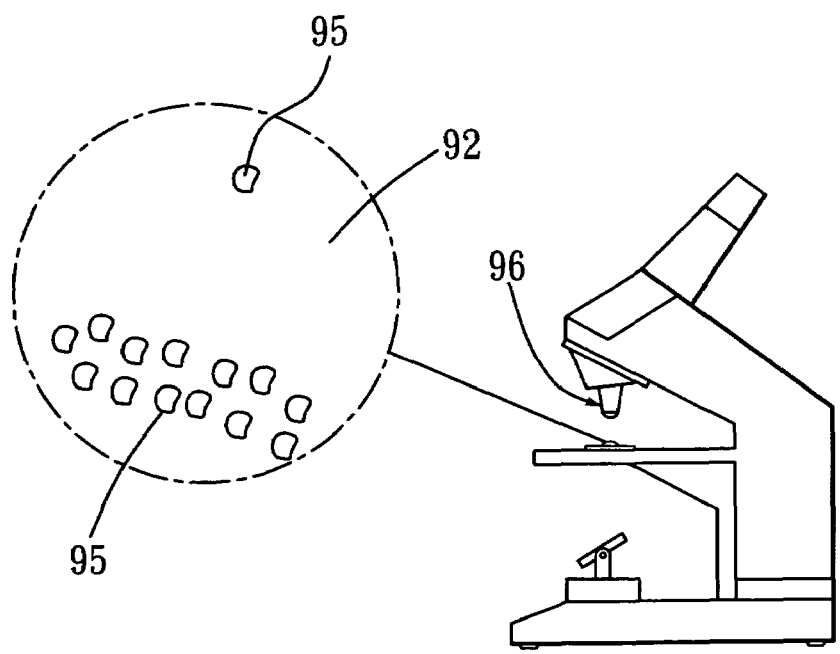
FIG. 10 is an enlarged view showing a portion of the aerosol distribution of the conventional device observed by a microscope.

As shown in FIG. 6, it is the third preferred embodiment that is modified from the second preferred embodiment. It further comprises a straight channel 14. This straight channel 14 increases the space of the first chamber 12 significantly. Hence, the air flows more smoothly and the aerosols 95 become more evenly distributed.

Practically, the aerosol size-selective sampler 93 and the first housing 10 can be formed as an integral structure.

The advantages and functions of this invention can be summarized as follows:

[1] flow guiding portion makes the entire air flow smooth and evenly distributed. Due to the sloped conical surface, it can guide the air flowing smoothly. So, the air flows through it at a steady and smooth condition.

[2] The aerosols will be evenly distributed and uniformly deposited on the filter media. Since these aerosols are carried by a steady and smooth flowing air, the aerosols will stay on the filter media under an evenly distributed condition. Therefore, the user can divide the total area into many small and equal areas. Counting the amount of aerosols in one small area and then multiplying certain number by using statistical methods can obtain the total amount of the aerosols. Thus, the data will be more precise than before.

[3] It is easy to evaluate the amount of the aerosols. Because the aerosols will stay on the filter media at an evenly distributed and uniformly deposited condition, the use can count the amount of aerosols in a specific small portion of the entire area. After which, the user can multiply certain number. Moreover, the user can analyze the composition of the sampled aerosols only detect a small portion of the entire filter media, since the sampled aerosols have uniformly deposited on the filter media.

The above embodiments are only used to illustrate the present invention, not intended to limit the scope thereof. Many modifications of the above embodiments can be made without departing from the spirit of the present invention.

What is claimed is:

1. A uniform aerosol deposit sampling device comprising:
a first housing having an air inlet, a first chamber, a conical portion, and a straight channel, said air inlet connecting with said first chamber, said air inlet having a cross-sectional area being smaller than a cross-sectional area of said first chamber, and said straight channel having a length substantially equal to or greater than the length of said conical portion;
a second housing having an air outlet, a second chamber, a filter holder and a flow guiding portion; said first chamber connecting with said second chamber; said filter holder being disposed between said second chamber and said flow guiding portion for securing an air-penetratable supporting pad and a filter media, said air outlet communicating with said flow guiding portion, said air outlet having a cross-sectional area that is smaller than a cross-sectional area of said second chamber, said flow guiding portion being a substantially conical and gradually narrowing, said flow guiding portion having a semi-conical angle ranged from 15 to 85 degrees.

2. The uniform aerosol deposit sampling device as defined in claim 1, wherein said air-penetratable supporting pad is a paper-made plate with a plurality of tiny holes allowing air to penetrate through; and said filter media is made by PVC.

3. The uniform aerosol deposit sampling device as defined in claim 1, further comprising:
an aerosol size-selective sampler engaged with the air inlet of the first housing; and
an air pump mounted on the air outlet of the second housing to drawing air in.

4. The uniform aerosol deposit sampling device as defined in claim 3, wherein the air pump is a high volume personal sampler.

5. The uniform aerosol deposit sampling device as defined in claim 3, wherein said aerosol size-selective sampler and said first housing are formed as an integral structure.

* * * * *